United States Patent [19]
Van Fleet

[11] Patent Number: 5,873,116
[45] Date of Patent: Feb. 16, 1999

[54] METHOD AND APPARATUS FOR CONTROLLING ACCESS TO DATA STRUCTURES WITHOUT THE USE OF LOCKS

[75] Inventor: James William Van Fleet, Austin, Tex.

[73] Assignee: International Business Machines Corp., Armonk, N.Y.

[21] Appl. No.: 754,352

[22] Filed: Nov. 22, 1996

[51] Int. Cl.[6] .............................. G06F 12/00; G06F 7/00
[52] U.S. Cl. ..................... 711/147; 711/165; 711/154; 707/8
[58] Field of Search ................................. 711/152, 147, 711/154, 165; 707/8; 395/726

[56] References Cited

U.S. PATENT DOCUMENTS

| | | | |
|---|---|---|---|
| 4,845,624 | 7/1989 | Clayton et al. | 707/8 |
| 5,089,952 | 2/1992 | Bozman | 395/726 |
| 5,247,672 | 9/1993 | Mohan | 711/152 |
| 5,263,161 | 11/1993 | Barth et al. | 711/152 |
| 5,333,310 | 7/1994 | Saki | 707/8 |
| 5,495,609 | 2/1996 | Scott | 707/8 |

OTHER PUBLICATIONS

Inohara et al., "Page–Based Optimistic Concurrency Control for Memory–Mapped Persistent Object Systems", Proceedings of the 28th Annual Hawaii International Conference on System Sciences, pp. 645–654, 1995.

*Primary Examiner*—Tod R. Swann
*Assistant Examiner*—Conley B. King, Jr.
*Attorney, Agent, or Firm*—Richard A. Henkler

[57] ABSTRACT

A method and system for altering data contained in a structure without requiring a lock to the structure itself. The method and apparatus retrieve a pointer to the structure from a location responsible for maintaining a pointer to the structure. The structure has a reference count for indicating processes that are currently using the data residing within the structure itself. The reference count is then atomically incremented and a new structure is obtained. The data contained in the structure, to be altered, is then copied to the new structure. The new structure also has a reference count for indicating processes that are currently using the data residing in the new structure. The reference count of the new structure is then set to indicate that a single process is accessing the new structure. Thereafter, the pointer in the responsible location for the structure, to be altered, is atomically replaced with a pointer to the new structure. The reference count of the new structure is then set to indicate that the single process is no longer accessing the new structure.

9 Claims, 5 Drawing Sheets

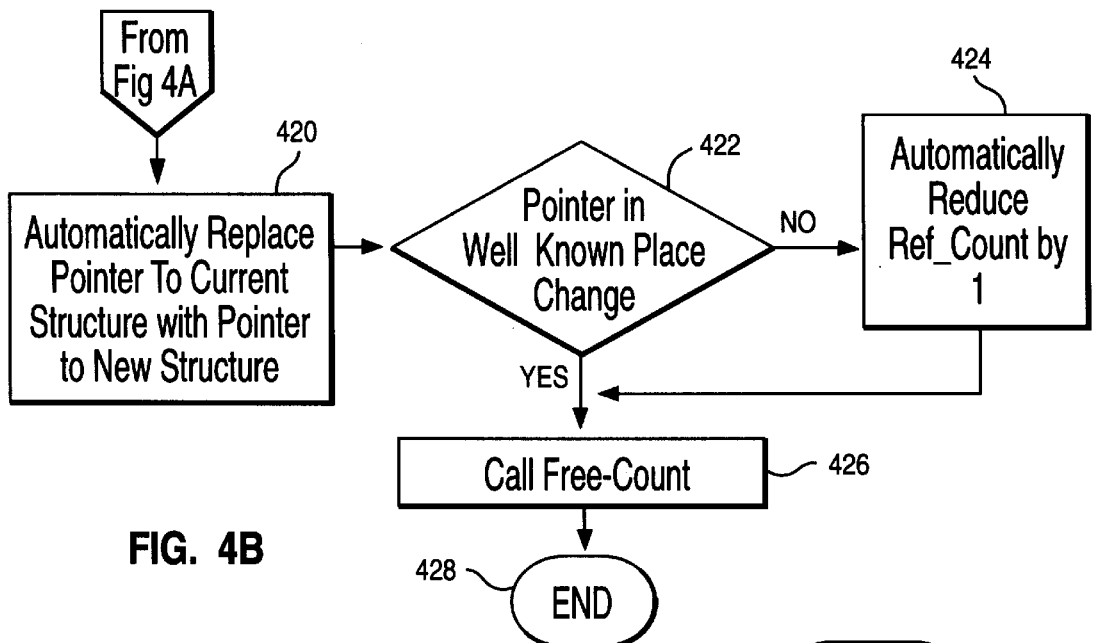
FIG. 4B
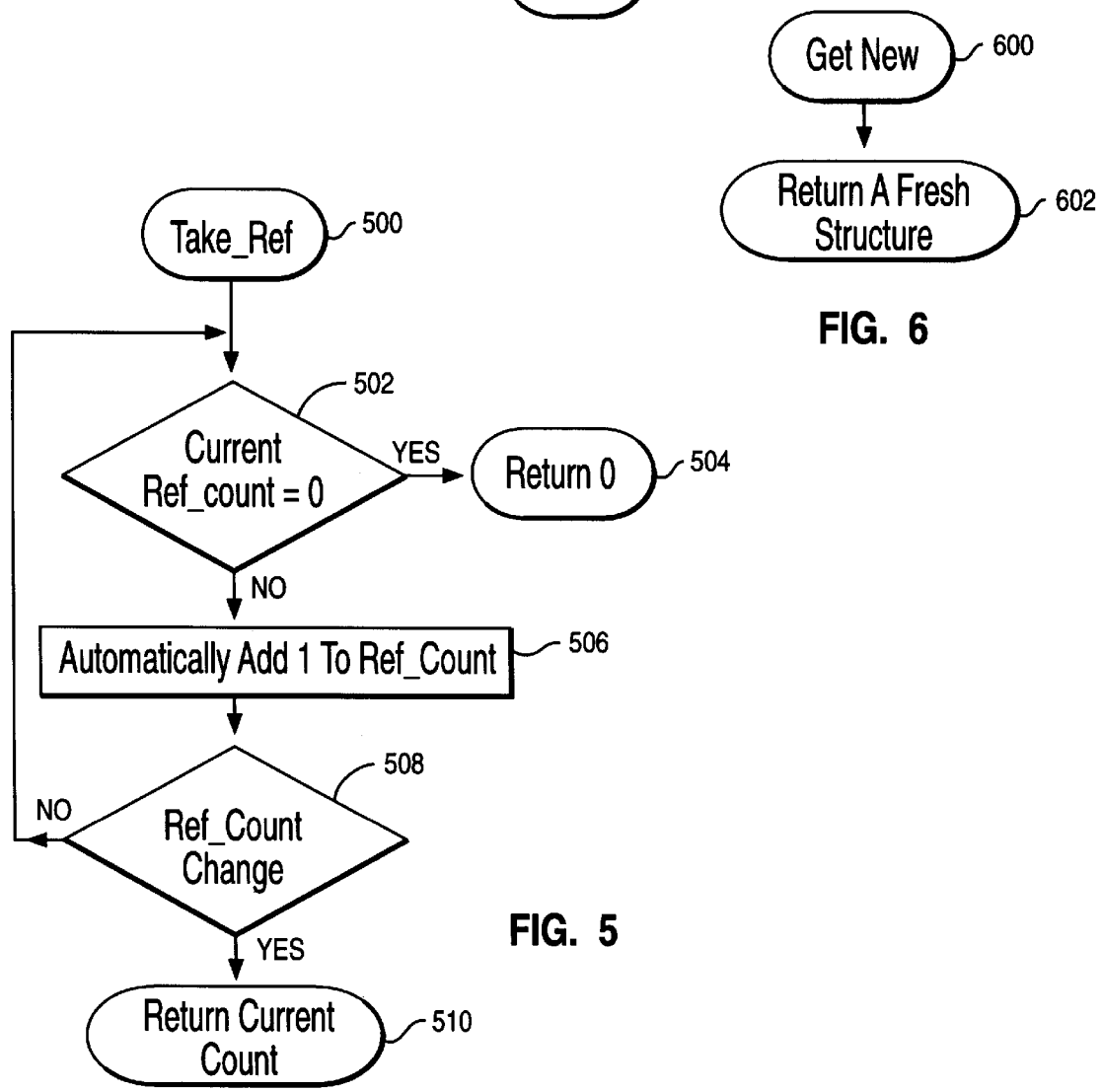
FIG. 6
FIG. 5

METHOD AND APPARATUS FOR CONTROLLING ACCESS TO DATA STRUCTURES WITHOUT THE USE OF LOCKS

BACKGROUND

1. Field of the Present Invention

The present invention generally relates to data processing systems, and more specifically to method and apparatuses that allow data structures to be processed in parallel without locks.

2. History of Related Art

The evolution of the computer industry has been driven by the insatiable appetite of the consumer for ever increased speed and functionality. One species that the evolution has created is the multi-processor computer.

The multi-processor systems, in similarity to other computer systems, have many different areas that are ripe for improvement. One such area ripe for improvement evolves within the operating systems for such multi-processor environments (e.g. UNIX, AIX, etc.). More specifically, in such a multi-processor environment, locks are typically used for controlling access to data structures in order to maintain data integrity.

The methods currently used by the industry, however, use a system-wide lock in order to serialize access to the data contained in the structure. As a result of the system-wide lock, any data contained in the structure which requires alteration, also requires use of the system-wide lock. Unfortunately, in multi-processor environments these type of methods decrease the overall performance of the system.

It would, therefore, be a distinct advantage to have a method and apparatus in which data structures could be changed without using any locks. The present invention provides such a method and apparatus.

BRIEF DESCRIPTION OF THE DRAWING

FIGS. 4A–B are a flowchart illustrating the method used for changing data contained in the credential structure of FIG. 1 without obtaining a lock according to the teachings of the present invention;

FIG. 5 is a flowchart illustrating the steps taken by the procedure Take_Reference as referred to in FIGS. 4A–B according to the teachings of the present invention;

FIG. 6 is a flowchart illustrating the creation/retrieval of a new credential structure according to the teachings of the present invention.

SUMMARY OF THE INVENTION

In one aspect, the present invention is a method of altering the data contained in a structure without locking the structure. The method includes the step of retrieving a pointer to the structure from a location responsible for maintaining a pointer to the structure. The structure has a reference count for indicating processes that are currently using the data residing in the structure itself. The method also includes the steps of atomically incrementing the reference count, and creating a new structure. The method further includes the step of copying the data contained in the structure to be altered to the new structure. The new structure also has a reference count for indicating processes that are currently using the data residing within the structure itself. The method also includes the step of setting the reference count of the new structure to indicate a single process is accessing the new structure. The method further includes the step of atomically replacing the pointer in the responsible location for the structure with the pointer to the new structure. The method further includes the step of setting the reference count of the new structure to indicate that the single process is no longer accessing the new structure.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
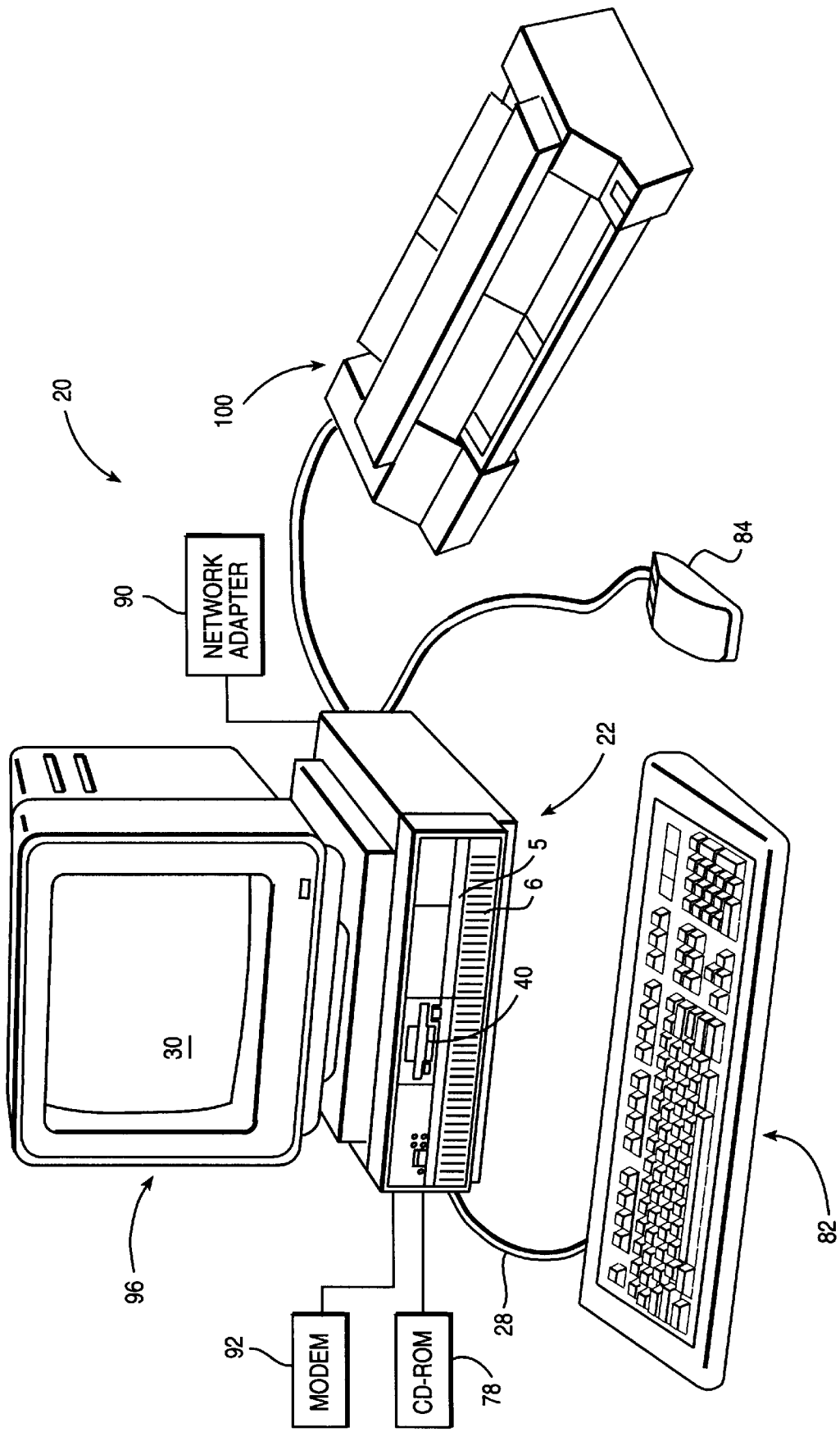
FIG. 1 is a schematic diagram of a typical multi-processor computer system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
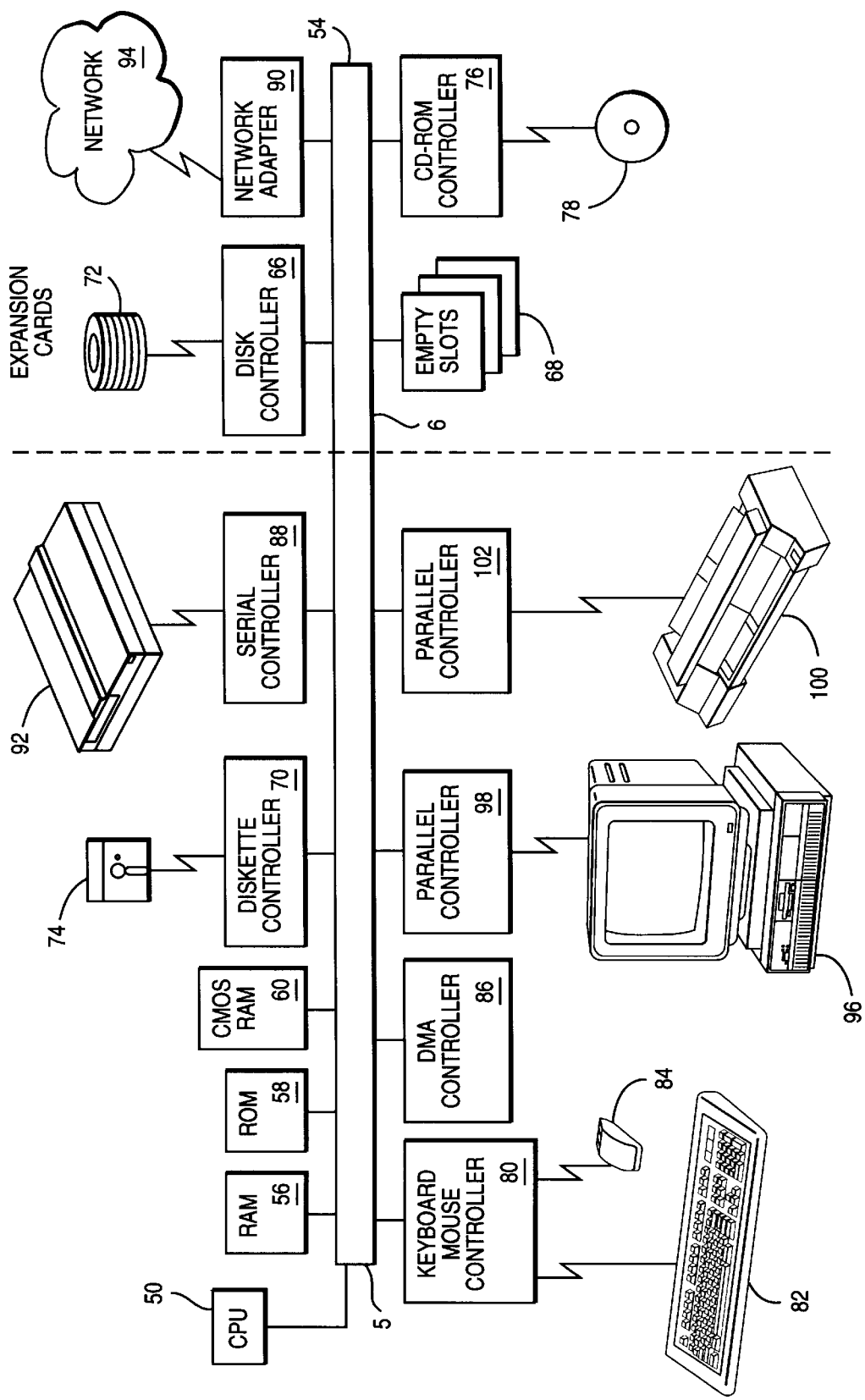
FIG. 2. is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not lose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

In the preferred embodiment of the present invention, the data processing system of FIG. 1 uses the AIX Operating System produced by International Business Machines Corporation. Specific information concerning various control structures and their functions can be found in "The Design of the Unix Operating System" by Maurice J. Bach, which is incorporated herein by reference. In the preferred embodiment of the present invention, the structures to which the present invention is applied are the AIX data structures referred to as credentials.

Those skilled in the art, however, will readily recognize that the application of the present invention is not to be limited to the managing of specific data structures, such as credential structures, but is equally applicable to equivalent and non-equivalent structures alike, as well as other data structures existing in other equivalent and non-equivalent operating systems. There are, however, some requirements that the data structures must satisfy in order for the present invention to operate. The following comprises the requirements for the data structures:

(1) need to be relatively independent;

(2) have no internal list pointers;

(3) have a reference count; and (4) are pointed to by a pointer kept in a well known location.

Figure 3:
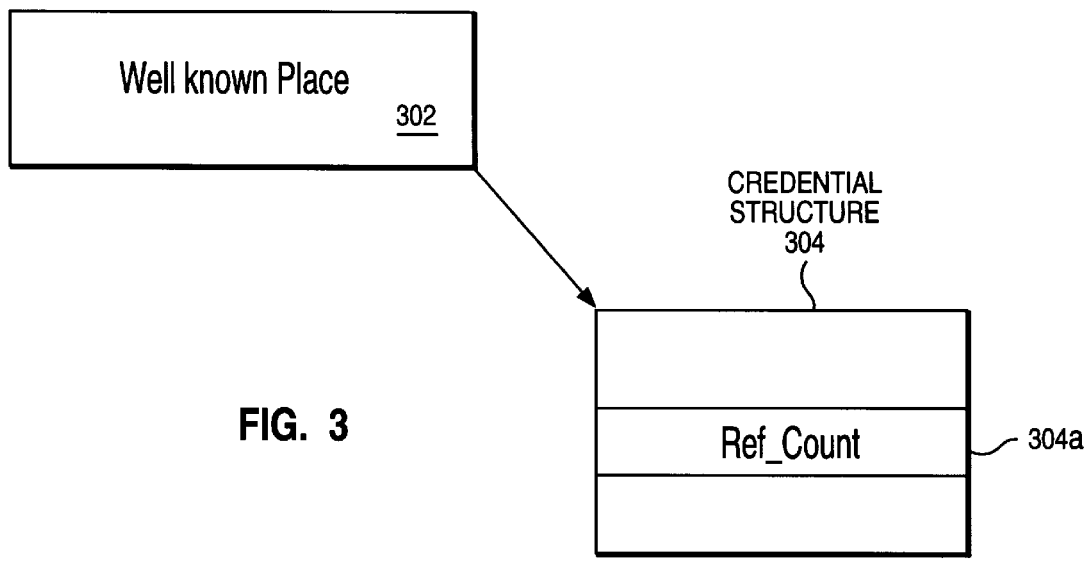
FIG. 3 is a block diagram illustrating the pointer management for using the credential data structures of FIG. 1 according to the teachings of the present invention.

Reference now being made to FIG. 3, a block diagram is shown illustrating the pointer management for using the credential data structures of FIG. 1 according to the teachings of the present invention. As shown in FIG. 3, the credential structure 304 contains a reference count (Ref_Count) 304A which tracks the number of processes currently having authorized use. In AIX, a pointer is kept in the U.U_CRED to a valid credential structure. The U.U_CRED is referred to hereinafter as "The well-known place". This relationship is illustrated by "well-known place" structure 302 pointing to the credential structure 304. The ability to modify the data contained in the credential structure 304 without using a lock is explained in detail hereinafter in connection with FIGS. 4A–B.

Figure 4A:
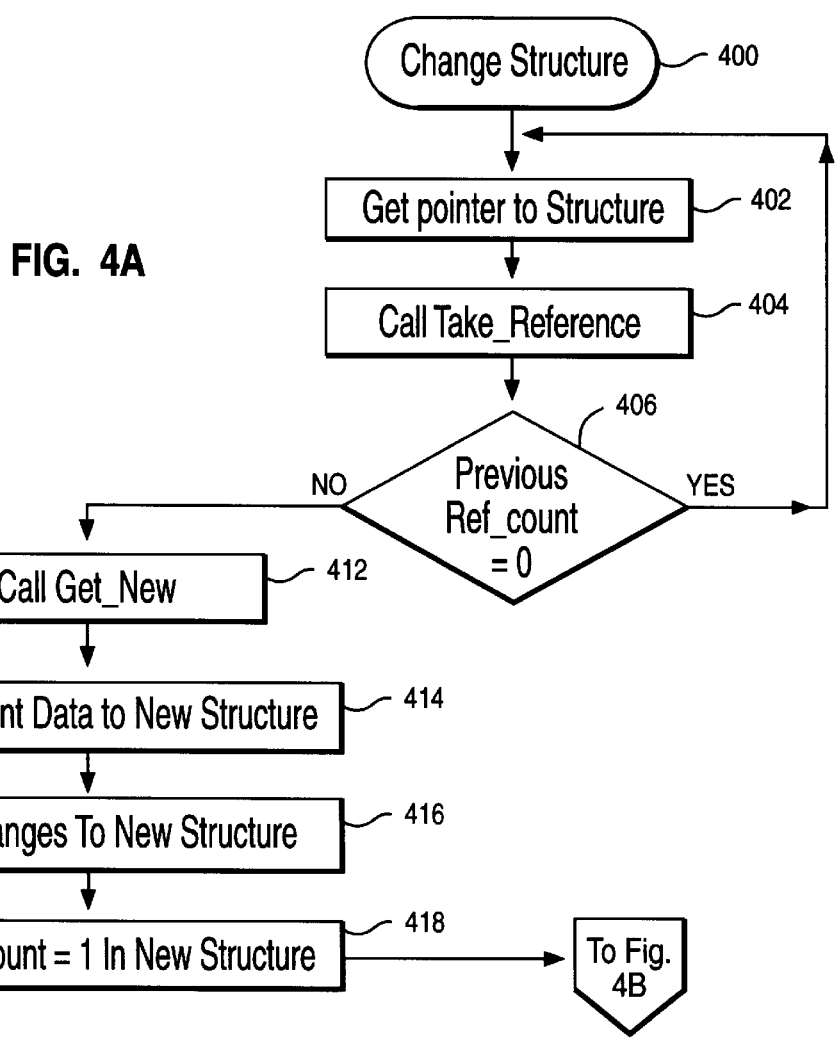

Reference is now being made to FIGS. 4A–B, a flowchart is shown illustrating the method used for changing data contained in the structure 304 of FIG. 1 without obtaining a lock according to the teachings of the present invention. The method begins at step 400, and proceeds to step 402 where a pointer, to the structure 304 desired to be modified, is retrieved from the well known place 302.

Thereafter, the method proceeds to step 404 where the procedure Take_Reference is called.

The Take_Reference procedure is explained in greater detail in connection with FIG. 5, but for discussion purposes it is noted that the procedure is responsible for obtaining a reference to the structure desired to be modified (hereinafter, referred to as changing structure), and returning the current Ref_Count 304a value of the changing structure. A reference is taken to the structure in order to "hold" or reserve the data contained in the structure until the desired changes have been completed.

The method then proceeds to step 406 where it is determined whether or not the returned value of the Ref_Count is equal to zero. If the value of the Ref_Count is equal to zero, then this indicates that during the previous preparation for altering the changing structure, another process made the changing structure inactive. Consequently, the method must be started anew.

If, at step 406, it is determined that the Ref_Count is equal to zero (i.e. changing structure inactive), then the method proceeds back to step 402 and repeats the above noted process from that point. If, however, at step 406, it is determined that the Ref_Count is not equal to zero (i.e. changing structure still active), then the method proceeds to step 412.

At step 412, a new structure is retrieved from a pool of structures via a call to Get_New (which is explained in greater detail in connection with FIG. 6). Thereafter, the method proceeds to step 414 where the data from the changing structure is copied to the new structure. At this point, however, the Ref_Count of the new structure is set equal to zero and must remain as such.

Thereafter, the method proceeds to step 416 where the changes desired to be made on the changing structure are performed on the new structure. The method then proceeds to step 418 where the Ref_Count for the new structure is set equal to one. Thereafter, the method proceeds to step 420.

At step 420, the pointer to the changing structure in the well known place 302 is atomically replaced with a pointer to the new structure. Hereinafter, atomic refers to an operation which attempts a read or write to an address in storage uninterrupted by any other access to that address. The method then proceeds to step 422.

At step 422, it is determined whether or not the pointer located in the well known place 302 changed from the previous operation (see step 420). If, at step 422, the pointer in the well known place 302 changed, then the method proceeds to step 426. If, however, at step 422, the pointer in the well known place 302 did not change, then the method proceeds to step 424. At step 424, the Ref_Count of the changing structure is atomically reduced by one, and the method proceeds to step 426. At step 426, the procedure Free_Count (explained in greater detail in connection with FIG. 7) is called. Thereafter, the method proceeds to end at step 428.

Reference now being made to FIG. 5, a flowchart is shown illustrating the steps taken by the procedure Take_Reference as referred to in FIGS. 4A–B according to the teachings of the present invention. The method begins at step 500, and proceeds to step 502 where it is determined whether or not the Ref_Count of the changing structure is equal to zero. If the initial value of Ref_Count is equal to zero this indicates that the changing structure has become inactive (free) by a different process. If, at step 502, it is determined that the Ref_Count is equal to zero, then the method proceeds to step 504 where a value of zero is returned to the calling procedure (change structure).

If, however, at step 502, it is determined that the Ref_Count is not equal to zero, then the method proceeds to step 506. At step 506, the Ref_Count is atomically incremented by one, and the method proceeds to step 508. At step 508, it is determined whether or not the atomic addition was successful. If at step 508, the Ref_Count changed, then the atomic addition was successful, and the method proceeds to step 510 where the current value of the Ref_Count is returned to the calling procedure (change structure). If, however, at step 508, the Ref_Count did not change, then the atomic addition was not successful, and the method proceeds back to step 502 and repeats the above process from that point.

Reference now being made to FIG. 6, a flowchart is shown illustrating the creation/retrieval of a new structure according to the teachings of the present invention. The method begins at step 600 and proceeds to step 602 where a new structure is returned to the calling procedure (change structure).

Figure 7:
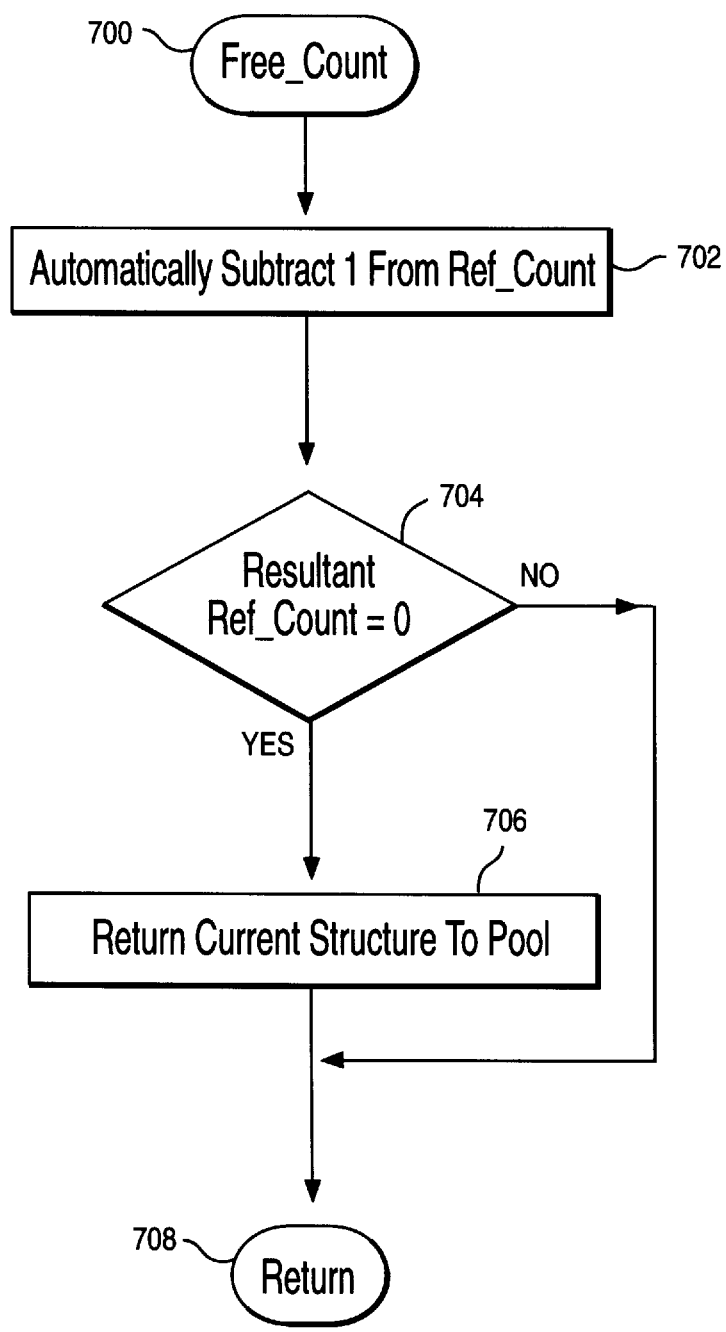
FIG. 7 is a flowchart illustrating the steps taken by the Free_Count procedure as referenced by FIGS. 4A–B according to the teachings of the present invention.

Reference now being made to FIG. 7, a flowchart is shown illustrating the steps taken by the Free_Count procedure as referenced by FIGS. 4A–B according to the teachings of the present invention. The method begins at step 700, and proceeds to step 702 where the Ref_Count of the changing structure is atomically incremented by one. Thereafter, the method proceeds to step 704 where it is determined whether or not the resulting Ref_Count is equal to zero.

If, at step 704, it is determined that the current value of the Ref_Count is equal to zero, then the method proceeds to step 706. If, however, at step 704, it is determined that the current Ref_Count is not equal to zero, then the method proceeds to step 708, and returns to the calling procedure. At step 706, the structure is returned to the pool of structures for future use, and the method proceeds to return to the calling procedure at 708.

It is thus believed that the operation and construction of the present invention will be apparent from the foregoing description. While the method and system shown and described has been characterized as being preferred, it will be readily apparent that various changes and/or modification could be made herein without departing from the spirit and scope of the present invention as defined in the following claims.

I claim:

1. A method of altering data contained in a structure without locking the structure, the method comprising the steps of:

retrieving a pointer to a structure from a location responsible for maintaining a pointer to the structure, the structure having a reference count for indicating processes that are currently using the data residing therein;

copying the data contained in the structure to a new structure, the new structure having a reference count for indicating processes that are currently using the data residing therein;

setting the reference count of the new structure to indicate a single process is accessing the new structure;

altering the data in the new structure;

replacing, while the reference count of the structure indicates that at least one process is using the data residing therein, the pointer in the responsible location for the structure with a pointer to the new structure; and setting the reference count of the new structure to indicate that the single process is no longer accessing the new structure.

2. The method of claim 1 further comprising the step of:

atomically incrementing the reference count of the structure.

3. The method of claim 2 wherein the structure and new structure are both credential structures.

4. An apparatus for altering data contained in a structure without locking the structure, the apparatus comprising:

means for retrieving a pointer to a structure from a location responsible for maintaining a pointer to the structure, the structure having a reference count for indicating processes that are currently using the data residing therein;

means for copying the data contained in the structure to a new structure, the new structure having a reference count for indicating processes that are currently using the data residing therein;

means for setting the reference count of the new structure to indicate a single process is accessing the new structure;

means for altering the data in the new structure;

means for replacing, while the reference count of the structure indicates that at least one process is using the data residing therein, the pointer in the responsible location for the structure with a pointer to the new structure; and means for setting the reference count of the new structure to indicate that the single process is no longer accessing the new structure.

5. The apparatus of claim 4 further comprising:

means for atomically incrementing the reference count of the structure.

6. The apparatus of claim 5 wherein the structure and new structure are both credential data structures.

7. A computer program product comprising:

a computer usable medium having a computer readable program code means embodied therein for altering data contained in a structure without locking the structure, the computer readable program code means comprising:

means for retrieving a pointer to a structure from a location responsible for maintaining a pointer to the structure, the structure having a reference count for indicating processes that are currently using the data residing therein;

means for copying the data contained in the structure to a new structure, the new structure having a reference count for indicating processes that are currently using the data residing therein;

means for setting the reference count of the new structure to indicate a single process in accessing the new structure;

means for altering the data in the new structure;

means for replacing, while the reference count of the structure indicates that at least one process is using the data residing therein, the pointer in the responsible location for the structure with a pointer to the new structure; and setting the reference count of the new structure to indicate that the single process is no longer accessing the new structure.

8. The computer program product of claim 7 wherein the computer readable program code means further comprises:

means for atomically incrementing the reference count of the structure.

9. The computer program product of claim 8 wherein the structure and new structure are both credential data structures.

* * * * *